C. E. BUGHER.
DIFFERENTIAL GEARING.
APPLICATION FILED OCT. 12, 1917.

1,297,439.

Patented Mar. 18, 1919.
2 SHEETS—SHEET 1.

Witness:
Leo f. Du Mais.

Inventor:
Clarence E. Bugher
by Robt. Klotz
Atty.

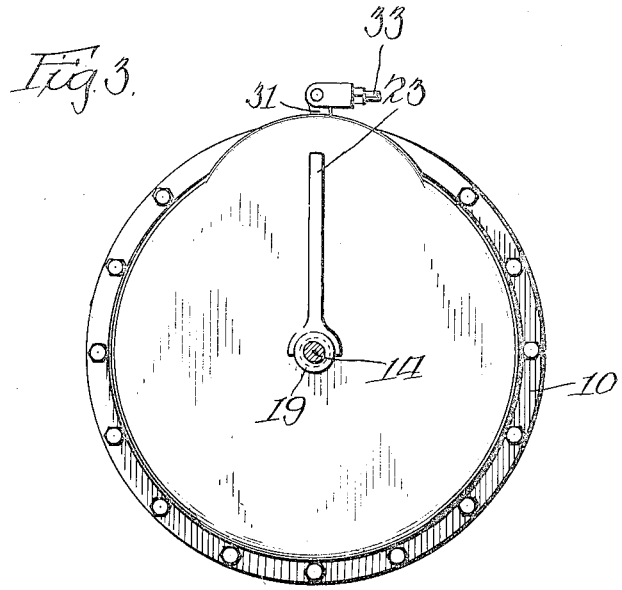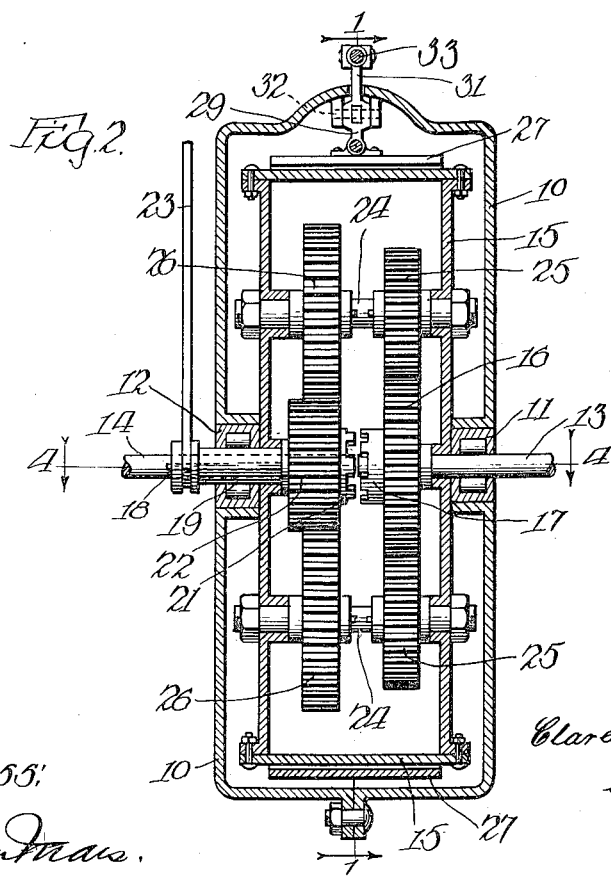

UNITED STATES PATENT OFFICE.

CLARENCE E. BUGHER, OF BROOKSTON, INDIANA, ASSIGNOR, BY MESNE ASSIGNMENTS, TO AUTO SPEED GEAR MANUFACTURING CO.

DIFFERENTIAL GEARING.

1,297,439.   Specification of Letters Patent.   Patented Mar. 18, 1919.

Application filed October 12, 1917. Serial No. 196,306.

*To all whom it may concern:*

Be it known that I, CLARENCE E. BUGHER, a citizen of the United States, residing at Brookston, in the county of White and State of Indiana, have invented certain new and useful Improvements in Differential Gearings, of which the following is a specification.

My invention relates to transmission gearing and has for its primary object the provision of improved means for connecting two shafts together at different speeds while maintaining constantly in mesh the gears of a train of gears which extends from one to the other.

With the above and other objects in view, this invention consists substantially in the combination, arrangement, and construction of parts all as hereinafter described and more particularly illustrated in the accompanying drawings which form a part of this specification and show the preferred embodiment of the invention.

In the drawings:

Fig. 2 is a section taken substantially on line 2—2 of Fig. 1;

Fig. 3 is an end elevation of the inclosing casing for the invention, showing a clutch lever and a brake band forming parts of the invention.

Figure 1:
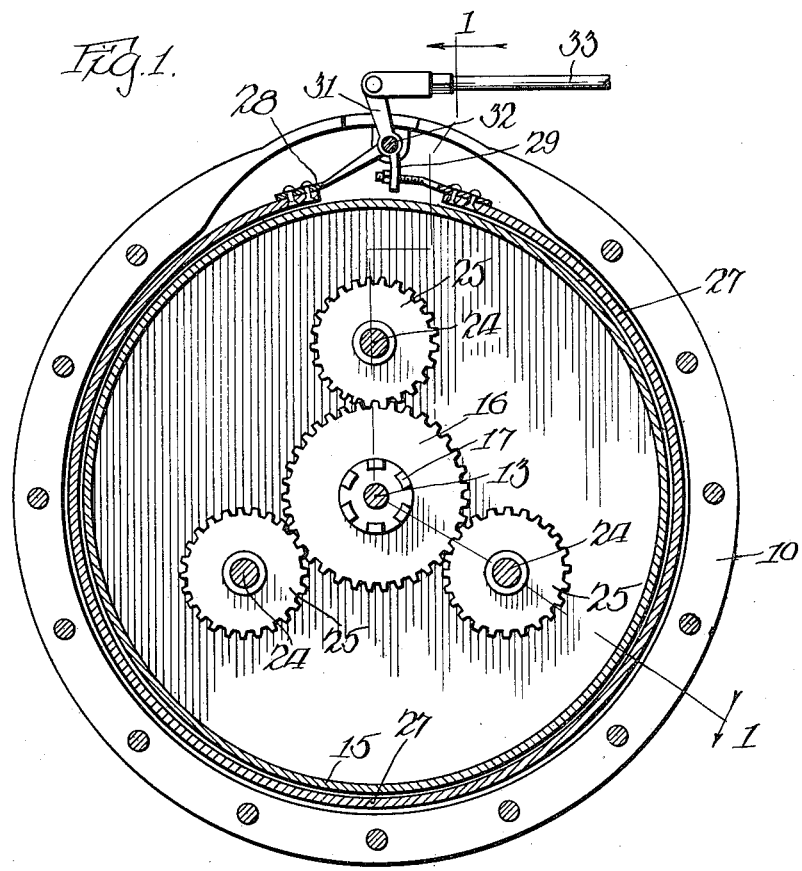
Figure 1 is a section taken substantially on line 1—1 of Fig. 2.
Figure 4:
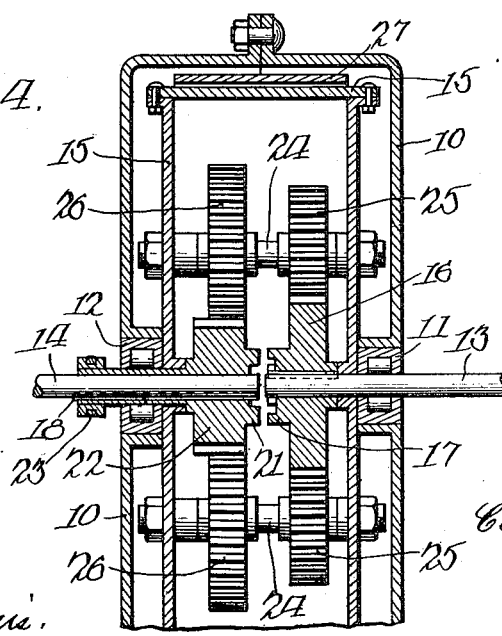
Fig. 4 is a section taken on line 4—4 of Fig. 2.

Reference numeral 10 represents a casing for my improved transmission gearing and which may be upheld in any suitable manner, not illustrated. This casing is substantially cylindrical and carries centrally in its ends a pair of alined shaft bearings 11 and 12 in which are respectively journaled a power shaft 13 and a drive shaft 14, these shafts nearly meeting within the casing in order to support other parts to be described. Journaled upon the alined shafts and within the casing is a cylindrical drum 15 which fills, in length, the space between the bearings 11 and 12. Fixed upon the inner end of the power shaft 13 is a power pinion 16 which is preferably integral with a clutch member 17 also fixed upon the power shaft. By means of a key 18, a sleeve 19, formed integrally with a complementary clutch member 21 and a drive gear 22, is splined on the drive shaft 14, the gear 22 being axially elongated for a purpose which will appear. The sleeve 19 extends without the casing 10 and on its outer end is provided with a peripheral channel in which is positioned an ordinary type of clutch lever bifurcated at one end to fit within the channel. This clutch lever, which is numbered 23, is broken away in the drawings; by its manipulation the sleeve 19 clutch member 21 and drive gear 22 may be shifted longitudinally of the drive shaft 14 to close or open the two clutch members 17 and 21. When these members are interengaged the power and drive shafts are joined together for rotation at the same speed.

The cylindrical drum 15 is traversed by preferably three transmission shafts 24 equidistant from shaft 13 and 120° apart. Each of these three shafts is rotatably mounted in the ends of the drum and carries fixed to it near one end a power gear 25 and fixed to it near the other end a drive pinion 26, the gears 25 meshing at all times with the power pinion 16, and the pinions 26 meshing at all times with the drive gear 22. As the power pinion 16 is larger than the drive gear 22 it is obvious that, when power from the power shaft is conveyed to the drive shaft through the train of gears 16, 25, 26, 22 shaft 14 will turn faster than shaft 13. This connection of the power and drive shafts is acquired by opening the clutch members 17 and 21, the axial elongation of drive gear 22 permitting it to slide the necessary distance between transmission pinions 26 while maintaining its meshed relation with those pinions at all times. During this connection of the power and drive shafts the drum 15 is kept from rotation by any suitable means, such, for instance, as the well known form of brake band shown at 27, which, in the customary manner, is anchored at one end as at 28 and has its opposite end fastened to the movable inner end 29 of a brake lever 31 pivoted at 32 and operated by a brake rod 33 positioned outside of the casing 10. The friction of the band 27 holds the drum against revolution under the torque exerted by the power shaft and gearing. When the clutch is closed, however, the band 27 is loose upon the drum, as the whole drum turns at that time.

While I have illustrated and described the preferred embodiment of my invention, it will be obvious that one skilled in the art may make modifications thereof without departing from the spirit of the invention. I wish, therefore, not to be restricted to the precise embodiment shown, except in so far as the same is limited in the appended claims.

I claim:

1. The combination with alined shafts, of means for clutching the shafts together at will, a support journaled on the shafts, a train of gears connecting one shaft to the other and carried in the support, and a device operable at will for holding the support from rotation; said means for clutching comprising a clutch member permanently splined on one of the shafts and co-axial therewith and a companion clutch member fixed upon the other shaft, and said train comprising an axially elongated gear fixed on said splined clutch member.

2. In combination, a pair of spaced alined bearings, a power shaft in one bearing, a drive shaft in the other, a clutch member fixed on the power shaft, a complementary clutch member permanently splined on the drive shaft, a drum centrally journaled on said power and drive shafts, said shafts extending into the drum, a transmission shaft within the drum spaced from and paralleling the power and drive shafts, a power pinion fixed on the power shaft within the drum, a drive gear fixed on said splined clutch member, a transmission gear fixed on the transmission shaft and meshing with the power pinion, a transmission pinion fixed on the transmission shaft and meshing with said drive gear, and means for shifting said splined clutch member into engagement with the fixed clutch member, said pinions and gears being constantly in mesh.

3. In combination, a pair of spaced alined bearings, a power shaft in one bearing, a drive shaft in the other, a clutch member fixed on the power-shaft, a complementary clutch member permanently splined on the drive shaft, a drum centrally journaled on said power and drive shafts, a power pinion fixed on the power shaft within the drum, a drive gear fixed on said splined clutch member, a plurality of transmission shafts within the drum spaced from and paralleling the power and drive shafts, a transmission gear fixed on each transmission shaft and in mesh with said power pinion, a transmission pinion on each transmission shaft and constantly meshed with said drive gear, and means for shifting said splined clutch member into engagement with the fixed clutch member, said pinions and gears being constantly in mesh.

4. In combination, a pair of spaced alined bearings, a power shaft in one bearing, a drive shaft in the other, a clutch member fixed on the power shaft, a complementary clutch member permanently splined on the drive shaft, a drum centrally journaled on said power and drive shafts, said shafts extending into the drum, a transmission shaft within the drum spaced from and paralleling the power and drive shafts, a power pinion fixed on the power shaft within the drum, an elongated drive gear fixed on said splined clutch member, a transmission gear fixed on the transmission shaft and meshing with the power pinion, a transmission pinion fixed on the transmission shaft and constantly in mesh with the drive gear, and means for shifting said splined clutch member into engagement with the fixed clutch member, said pinions and gears being constantly in mesh.

5. In combination, a pair of spaced alined bearings, a power shaft in one bearing, a drive shaft in the other, a clutch member fixed on the power shaft, a complementary clutch member permanently splined on the drive shaft, a drum centrally journaled on said power and drive shafts, said shafts extending into the drum, a transmission shaft within the drum spaced from and paralleling the power and drive shafts, a power pinion fixed on the power shaft within the drum, a drive gear fixed on said splined clutch member, a transmission gear fixed on the transmission shaft and meshing with the power pinion, a transmission pinion fixed on the transmission shaft and meshing with said drive gear, means for shifting said splined clutch member into engagement with the fixed clutch member, and a band brake about the drum, said pinions and gears being constantly in mesh.

In testimony whereof I have affixed my signature.

CLARENCE E. BUGHER.